United States Patent
Nagai et al.

(10) Patent No.: US 6,187,855 B1
(45) Date of Patent: Feb. 13, 2001

(54) BUTADIENE RUBBER ADHESIVE COMPOSITION WITH SPECIFIED LOW SYNDIOTACTIC-BUTADIENE CONTENT

(75) Inventors: Yuichi Nagai; Ken Yamaguchi, both of Kodaira (JP)

(73) Assignee: Bridgestone Corporation, Tokyo (JP)

( * ) Notice: Under 35 U.S.C. 154(b), the term of this patent shall be extended for 0 days.

(21) Appl. No.: 09/068,863

(22) PCT Filed: Oct. 8, 1997

(86) PCT No.: PCT/JP97/03606

§ 371 Date: May 19, 1998

§ 102(e) Date: May 19, 1998

(87) PCT Pub. No.: WO99/18167

PCT Pub. Date: Apr. 15, 1999

(51) Int. Cl.$^7$ .............................. C08L 47/00; C09J 109/00
(52) U.S. Cl. .................. 524/526; 524/571; 525/236; 156/334
(58) Field of Search ........................ 524/526, 502, 524/571; 525/55, 232, 230; 156/334

(56) References Cited

FOREIGN PATENT DOCUMENTS

| 53-39917 | 10/1978 | (JP) | ................. C08F/36/06 |
| 54-5436 | 3/1979 | (JP) | ................. C08F/36/06 |
| 55-5119508 | * 9/1980 | (JP) | ................. B60C/1/00 |
| 56-18005 | 4/1981 | (JP) | ................. C08F/36/06 |
| 61-24408 | 6/1986 | (JP) | ................. C08J/5/12 |
| 61-236874 | 10/1986 | (JP) | ................. C09J/3/14 |
| 3-3569 | 1/1991 | (JP) | ................. B29C/35/02 |

* cited by examiner

Primary Examiner—David W. Wu
Assistant Examiner—Kelechi C. Egwim
(74) Attorney, Agent, or Firm—Sughrue, Mion, Zinn, Macpeak & Seas, PLLC

(57) ABSTRACT

A rubbery adhesive composition wherein at least one adherend is a rubber composition including butadiene rubber as a rubber ingredient, characterized in that butadiene rubber is included as a rubber ingredient and 3~20% by weight of the butadiene rubber is syndiotactic-1,2-polybutadiene. Thus, it is possible to enhance the strength of the rubbery adhesive composition itself to improve the adhesion property before and after vulcanization without damaging the adhesion property at the interface.

10 Claims, No Drawings

BUTADIENE RUBBER ADHESIVE COMPOSITION WITH SPECIFIED LOW SYNDIOTACTIC-BUTADIENE CONTENT

TECHNICAL FIELD

This invention relates to a rubbery adhesive composition, and more particularly to a rubbery adhesive composition used when at least one adherend is a rubber composition containing butadiene rubber as a rubber ingredient.

The rubbery adhesive composition according to the invention can enhance adhesion property before and after vulcanization when either one of the adherends or both are the above specified rubber composition.

Further, the rubbery adhesive composition according to the invention is useful in the adhesion of rubbers such as tires particularly side rubber or rubber chaffer of a large-size pneumactic tire, conveyor belts and so on in the rubber industry.

BACKGROUND ART

A butadiene rubber composition obtained by compounding carbon black, sulfur and other additives such as a vulcanization accelerator and the like with butadiene alone or a rubber blend of butadiene rubber and other rubber is excellent in the cold temperature resistance, wear resistance, low heat build-up, flex resistance and the like as compared with a natural rubber composition or styrene-butadiene rubber composition, so that it is used for various rubber articles.

However, when at least one adherend is the above butadiene rubber composition, there is a problem that the adhesion property to the remaining adherend before and after vulcanization is poor.

In order to solve this problem, various adhesives have hitherto been applied. For example, there are natural rubber adhesive, butadiene rubber adhesive having a solubility parameter (SP) equal or approximate to that of the adherend, and so on.

In case of applying the natural rubber adhesive, the adhesion property before vulcanization can be improved, but the adhesion property after vulcanization is insufficient because covulcanization property at the adhesion interface is insufficient to lower an interfacial adhesion force. On the other hand, in case of applying the butadiene rubber adhesive, it is possible to improve the interfacial adhesion property to enhance the adhesion property before and after vulcanization, but the effect is still insufficient.

DISCLOSURE OF INVENTION

It is, therefore, an object of the invention to provide a rubbery adhesive composition capable of sufficiently enhancing the adhesion property before and after vulcanization when at least one adherend is a rubber composition containing butadiene rubber as a rubber ingredient.

From the viewpoint of the above, the rubbery adhesive composition according to the invention is a rubbery adhesive composition used when at least one adherend is a rubber composition containing butadiene rubber as a rubber ingredient, and is characterized in that butadiene rubber is included as a rubber ingredient and 3~20% by weight of the butadiene rubber is syndiotactic-1,2-polybutadiene (hereinafter referred to as "syn-1,2-PB").

The inventors have confirmed that in case of using the above conventional butadiene rubber adhesive, the interfacial adhesion property between the adherend and the adhesive is improved, but fracture inside the adhesion layer (cohesion failure) is caused because butadiene rubber per se is low in the strength as compared with natural rubber or the like.

Now, the inventors have made studies in order to largely improve the strength of the rubbery adhesive composition itself without lowering the interfacial adhesion property between the adherend and the adhesive composition and found that the aforementioned problem can be solved by including butadiene rubber as a rubber ingredient and replacing a given amount of butadiene rubber with syn-1, 2-PB as a crystalline resin and as a result the invention has been accomplished.

In the rubbery adhesive composition according to the invention, 3~20% by weight of butadiene rubber is replaced with syn-1,2-PB. When it is less than 3% by weight, the sufficient strength as the rubbery adhesive composition can not be obtained, while when it exceeds 20% by weight, the strength inversely becomes too high, and the rubbery adhesive composition can not follow deformation of the adherend and hence it is easy to cause the cohesion failure. From the same viewpoint, the amount of syn-1,2-PB compounded is preferable to be 5~10% by weight.

As a polymerization catalyst for syn-1,2-PB used in the invention, mention may be made of catalyst systems, for example, a soluble cobalt compound such as cobalt octoate, cobalt-1-naphthenate, cobalt benzoate or the like, an organoaluminum compound such as trimethylaluminum, triethylaluminum, tributylaluminum, triphenylaluminum or the like, carbon disulfide and so on. Furthermore, as a polymerization method, there can be used methods described in JP-B-53-39917, JP-B-54-5436 and JP-B-56-18005, but there is no limitation to these methods.

In the rubbery adhesive composition according to the invention, butadiene rubber is essential as a rubber ingredient, and natural rubber, styrene-butadiene rubber, isoprene rubber and the like may be included as the other rubber ingredient. The amount of the butadiene rubber inclusive of syn-1,2-PB compounded may be selected within a range of 1~100% by weight in the rubber ingredient and is favorable to be determined in accordance with the kind of the adherend and the amount of butadiene rubber compounded therein, for example, as follows.

① A case that both the adherend rubbers are the same:

It is most preferable that the compounding ratio of butadiene rubber in the rubber ingredient of the rubbery adhesive composition is substantially equal to that in the rubber composition of the adherend. When the compounding ratio differs between the adherend and the adhesive composition, if the difference in the compounding ratio therebetween is within a range of about 25% by weight, the desired effect can sufficiently be obtained.

② A case that both the adherend rubbers are different:

For example, when the compounding ratio of butadiene rubber in the rubber ingredient is a in the adherend rubber A and b in the other adherend rubber B and $a \geq b$, it is most preferable that the compounding ratio x of butadiene rubber in the rubbery adhesive composition used in the adhesion between these adherend rubbers satisfies a relation of the following formula:

$$a \geq x > b \text{ or } a = x = b$$

However, even when $b > x$ or $x > a$, if the difference in the compounding ratio is within a range of about 25% by weight, the desired effect can sufficiently be obtained.

Moreover, the compounding ratio of butadiene rubber in the adherend rubber B may be 0.

The rubbery adhesive composition according to the invention may properly be compounded with adequate amounts of usually used additives such as tackifier, softener, vulcanizing agent, vulcanization accelerator, accelerator activator, carbon black, silica and the like in addition to a solvent such as hexane, cyclohexane, petroleum ether, heptane, tetrahydrofuran or the like.

BEST MODE FOR CARRYING OUT THE INVENTION

The invention will be concretely described with reference to the following examples.

In Table 1 is shown a basic compounding recipe of a rubber composition as an adherend and a rubbery adhesive composition, while amounts of variable ingredients compounded are concretely shown in Tables 2–5 together with evaluation of adhesion property.

Moreover, Examples 1–6 and Comparative Examples 1–8 described in Tables 2 and 3 indicate a case of the adhesion between the same adherends wherein both the adherends are the same (adhesion between adherends A), and Examples 7–14 and Comparative Examples 9–16 described in Tables 4 and 5 indicate a case of the adhesion between different adherends wherein the adherends are different (adhesion between adherend A and adherend B).

The evaluation of adhesion property is as follows.

That is, the adhesion property before vulcanization is measured by means of a pick-up type tackiness tester at room temperature. The measured results are represented by an index on the basis that a control in every Table is 100. The larger the index value, the better the adhesion property. And also, the adhesion property after vulcanization is determined by measuring number of repetitions until 50% of adhesion area is broken under a constant strain through a uniaxial tensile fatigue fracture test. The measured results are represented by the number of repetitions. The larger the number, the better the adhesion property.

TABLE 1

| Compounding recipe | parts by weight |
|---|---|
| Rubber ingredient | 100 |
| Phenolic resin *1 | (variable) *5 |
| Carbon black *2 | 40 |
| Aromatic oil | 3 |
| Stearic acid | 2 |
| Zinc oxide | 3 |
| Antioxidant *3 | 3 |
| Vulcanization accelerator *4 | 0.8 |
| Sulfur | 1.5 |

*1 TACKROL 101, trade name, made by Taoka Kagaku Kogyo Co., Ltd.
*2 Show Black N330, trade name, made by Showa Cabot Co., Ltd.
*3 ANTIGENE 6C, trade name, made by Sumitomo Kagaku Kogyo Co., Ltd.
*4 SANTOCURE NS, trade name, made by Monsanto Co., Ltd.
*5 not compounded in the adherend

TABLE 2

(unit: parts by weight)

| | | Comparative Example 1 | Comparative Example 2 * | Comparative Example 3 | Comparative Example 4 | Example 1 | Example 2 | Comparative Example 5 |
|---|---|---|---|---|---|---|---|---|
| Adherend A | cis-1,4-PB | 50 | 50 | 50 | 50 | 50 | 50 | 50 |
| | Natural rubber | 50 | 50 | 50 | 50 | 50 | 50 | 50 |
| Adhesive rubber composition | Rubber ingredient cis-1,4-PB | — | — | 50 | 50 | 50 | 50 | 50 |
| | syn-1,2-PB | — | — | — | 1 | 5 | 5 | 25 |
| | Natural rubber | — | 100 | 50 | 49 | 45 | 45 | 25 |
| | Phenolic resin | — | 8 | 8 | 8 | 8 | 16 | 8 |
| Adhesion property before vulcanization (index) | | 7 | 100 | 72 | 72 | 71 | 102 | 70 |
| Adhesion property after vulcanization | Interfacial failure (number of repetitions) | 416 | 100 | — | — | 383 | 383 | — |
| | Cohesion failure (number of repetitions) | — | — | 223 | 223 | — | — | 187 |

* : control

TABLE 3

(unit: parts by weight)

| | | Comparative Example 6 | Comparative Example 7 * | Comparative Example 8 | Example 3 | Example 4 | Example 5 | Example 6 |
|---|---|---|---|---|---|---|---|---|
| Adherend A | cis-1,4-PB | 75 | 75 | 75 | 75 | 75 | 75 | 75 |
| | Natural rubber | 25 | 25 | 25 | 25 | 25 | 25 | 25 |
| Adhesive rubber | Rubber ingredient cis-1,4-PB | — | — | 75 | 75 | 75 | 25 | 50 |
| | syn-1,2-PB | — | — | — | 5 | 5 | 5 | 5 |

TABLE 3-continued (unit: parts by weight)

|  |  | Comparative Example 6 | Comparative Example 7 * | Comparative Example 8 | Example 3 | Example 4 | Example 5 | Example 6 |
|---|---|---|---|---|---|---|---|---|
| composition | Natural rubber | — | 100 | 25 | 20 | 20 | 70 | 45 |
|  | Phenolic resin | — | 8 | 8 | 8 | 16 | 16 | 16 |
| Adhesion property before vulcanization (index) |  | 8 | 100 | 77 | 77 | 112 | 125 | 121 |
| Adhesion property after vulcanization | Interfacial failure (number of repetitions) | 457 | 100 | — | 426 | 426 | 337 | 385 |
|  | Cohesion failure (number of repetitions) | — | — | 321 | — | — | — | — |

*: control

TABLE 4

(unit: parts by weight)

|  |  | Comparative Example 9 | Comparative Example 10 * | Comparative Example 11 | Comparative Example 12 | Example 7 | Example 8 | Example 9 | Comparative Example 13 | Example 10 |
|---|---|---|---|---|---|---|---|---|---|---|
| Adherend A | cis-1,4-PB | 75 | 75 | 75 | 75 | 75 | 75 | 75 | 75 | 75 |
|  | Natural rubber | 25 | 25 | 25 | 25 | 25 | 25 | 25 | 25 | 25 |
| Adherend B | cis-1,4-PB | 50 | 50 | 50 | 50 | 50 | 50 | 50 | 50 | 50 |
|  | Natural rubber | 50 | 50 | 50 | 50 | 50 | 50 | 50 | 50 | 50 |
| Adhesive rubber composition | Rubber ingredient cis-1,4-PB | — | — | 75 | 75 | 75 | 75 | 50 | 75 | 20 |
|  | syn-1,2-PB | — | — | — | 1 | 5 | 5 | 5 | 25 | 5 |
|  | Natural rubber | — | 100 | 25 | 24 | 20 | 20 | 45 | — | 75 |
|  | Phenolic resin | — | 8 | 8 | 8 | 8 | 16 | 16 | 8 | 8 |
| Adhesion property before vulcanization (index) |  | 12 | 100 | 81 | 81 | 81 | 115 | 108 | 80 | 98 |
| Adhesion property after vulcanization | Interfacial failure (number of repetitions) | 434 | 100 | — | — | 396 | 396 | 412 | — | 224 |
|  | Cohesion failure (number of repetitions) | — | — | 192 | 192 | — | — | — | 164 | — |

*: control

TABLE 5

(unit: parts by weight)

|  |  | Comparative Example 14 | Comparative Example 15 * | Comparative Example 16 | Example 11 | Example 12 | Example 13 | Example 14 |
|---|---|---|---|---|---|---|---|---|
| Adherend A | cis-1,4-PB | 75 | 75 | 75 | 75 | 75 | 75 | 75 |
|  | Natural rubber | 25 | 25 | 25 | 25 | 25 | 25 | 25 |
| Adherend B | cis-1,4-PB | 0 | 0 | 0 | 0 | 0 | 0 | 0 |
|  | Natural rubber | 100 | 100 | 100 | 100 | 100 | 100 | 100 |
| Adhesive rubber composition | Rubber ingredient cis-1,4-PB | — | — | 75 | 75 | 75 | 50 | 20 |
|  | syn-1,2-PB | — | — | — | 5 | 5 | 5 | 5 |
|  | Natural rubber | — | 100 | 25 | 20 | 20 | 45 | 75 |
|  | Phenolic resin | — | 8 | 8 | 8 | 16 | 16 | 16 |
| Adhesion property before vulcanization (index) |  | 12 | 100 | 81 | 81 | 115 | 122 | 131 |
| Adhesion property after vulcanization | Interfacial failure (number of repetitions) | 552 | 100 | — | 523 | 523 | 486 | 427 |
|  | Cohesion failure (number of repetitions) | — | — | 265 | — | — | — | — |

*: control

Common items in Tables 2–5 cis-1,4-PB (polybutadiene): BR01, trade name, made by JSR Corporation syn-1,2-PB: VCR412, trade name, made by Ube Kosan Co., Ltd. Natural rubber: RSS#1, trade name As mentioned above, according to the invention, it is possible to enhance the strength of the rubbery adhesive composition itself to improve the adhesion property before and after vulcanization without damaging the adhesion property at the interface.

What is claimed is:

1. A rubbery adhesive composition comprising butadiene rubber as a rubber ingredient, and a solvent, wherein 3~20% by weight of the butadiene rubber is syndiotactic-1,2-polybutadiene.

2. A rubbery adhesive composition according to claim 1, wherein the butadiene rubber is 1~100% by weight of the rubber ingredient in the rubbery adhesive composition.

3. The rubbery adhesive composition of claim 1, further comprising a tackifier.

4. The rubbery adhesive composition of claim 1, further comprising a softener.

5. The rubbery adhesive composition of claim 1, further comprising a vulcanizing agent.

6. The rubbery adhesive composition of claim 1, further comprising a vulcanization accelerator.

7. The rubbery adhesive composition of claim 1, further comprising an accelerator activator.

8. The rubbery adhesive composition of claim 1, further comprising carbon black.

9. The rubbery adhesive composition of claim 1, further comprising silica.

10. The rubbery adhesive composition of claim 1, wherein said solvent is selected from the group consisting of hexane, cyclohexane, petroleum ether, heptane and tetrahydrofuran.

* * * * *